March 28, 1961 F. C. SAVAGE 2,977,533
GAGING DEVICE
Filed Nov. 7, 1957
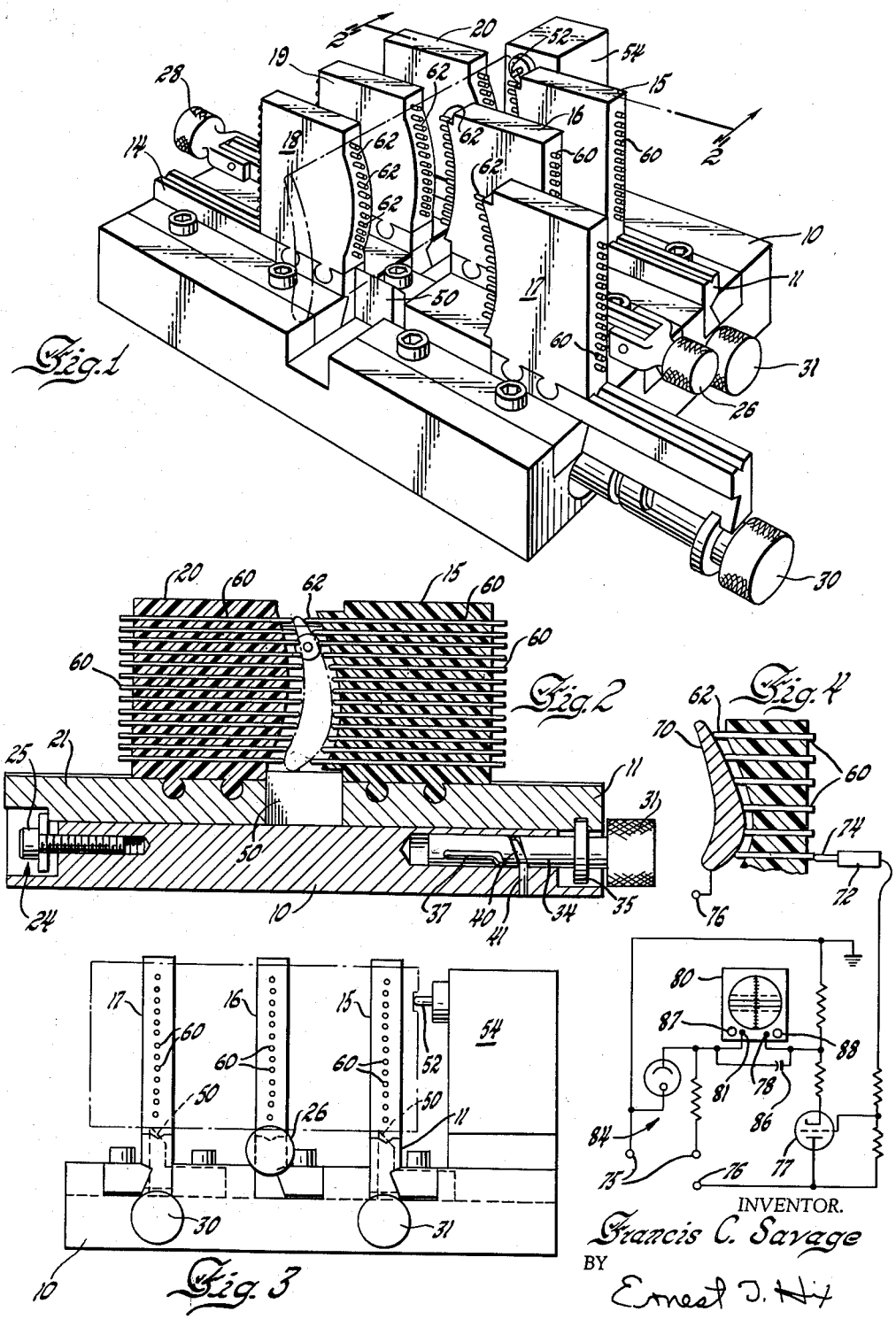
INVENTOR.
Francis C. Savage
BY
Ernest J. Hi
ATTORNEY

United States Patent Office 2,977,533
Patented Mar. 28, 1961

2,977,533

GAGING DEVICE

Francis C. Savage, Columbia, Conn., assignor to The Sheffield Corporation, Dayton, Ohio, a corporation of Delaware Filed Nov. 7, 1957, Ser. No. 695,117

7 Claims. (Cl. 324—71)

This invention relates to a gaging device and more particularly to a gaging device for measuring contours and dimensions.

It is an object of this invention to provide a gaging device for accurately and readily measuring deviations from a reference contour at closely spaced points along the surface of a part.

It is a further object to provide such a device wherein relatively spaced and insulated electrically conductive elements relatively arranged to define a reference contour are brought into association with a part formed of a conductive material or at least having a conductive surface at the area to be gaged, current flow through spark gaps obtained between each element and the part at locations of deviation from the reference contour being measured to determine the magnitude of the gap and the deviation.

It is a further object to provide such a device wherein the conductive elements are provided by wires supported in relatively insulated parallel relation with their corresponding ends defining the reference part contour, electrical gaging means being connectable to each wire and to the part for measuring any gap between each respective wire and the adjacent part surface to determine the part contour.

It is a further object to provide such a device wherein opposed pairs of relatively retractable blocks or holders are provided spaced along the part, each block including a plurality of relatively insulated wires exposed at corresponding ends in a contour defining relation, the opposite ends of each of the wires being accessible for application of a hand-held stylus forming a part of an electrical gaging system for determining the deviation of the part contour at selected locations.

Other objects of the invention will be apparent from the following description, the appended claims, and the accompanying drawing in which:

Figure 1 is a perspective view of an exemplary device embodying the present invention, Figure 2 is a sectional view taken on line 2—2 of Figure 1, Figure 3 illustrates, in elevation, one side of the unit of Figure 1, and Figure 4 is a diagrammatic illustration of an electrical circuit and application of the unit.

The present invention has particular application to gaging the contour of irregularly shaped parts formed of an electrically conductive material or having a conductive coating, plating or the like at the areas to be gaged.

A series of conductive elements relatively arranged to define a reference part contour are brought into close association with the part and are located either by engagement of one or more of the elements with the part or by positioning of an element carrier through a predetermined stop or other locating means. At points where the part contour deviates from the reference contour a gap will exist between the respective element and the part which varies with the deviation. When voltage is applied across the element and the part a spark gap is created. The amount of current in the arc (which is a function of the gap width) is measured and indicated. Thus closely spaced points can be accurately checked in an economical and rapid manner without dependence on operator skill or discretion.

In the illustrated device disclosing an exemplary embodiment as applied to gaging the contours of a jet engine blade a series of parallel gaging wires providing conductive elements at their corresponding ends are mounted in spaced and relatively insulated relationship in a template block. A hand-held stylus forming one lead of an electrical gaging circuit also connected to the blade is selectively applied to the outer end of each of the gaging wires. An oscilloscope forming a part of the electrical gaging circuit indicates varying electrical characteristics as determined by the width of the spark gap created between the respective gaging wires and blade surface. Opposed pairs of relatively retractable template blocks each carry a plurality of contour defining conductive elements for association with opposite sides of a blade in spaced gaging planes.

It will be appreciated that the present invention has application to a variety of dimensional and contour gaging applications and would not be limited to the specific construction illustrated.

In the exemplary device illustrated a base 10 supports parallel gaging blocks or templates 15 to 20 on slides in opposed pairs for association with each side of a blade in three chordwise gaging planes spaced therealong.

The opposed pairs of blocks are relatively retractable to allow loading of a blade into gaging position and are advanced toward one another into gaging association with the blade. Block 20 and its supporting slide 21 as well as block 18 and its slide 14 are fixed in position on base 10. The clamping arrangement for slide 21 is indicated at 24 in Figure 2 where screw 25 draws the slide against a block providing knife edge 50. Opposed blocks 16 and 19 are both movable on base 10 and are advanced toward and from one another by handles 26 and 28 attached to their respective supporting slides. Blocks 15 and 17 are moved to and from gaging position by screw knobs 31 and 30 respectively.

The details of the actuating structure for block 15 are shown in Figure 2. Knob 31 has a continuation 34 which is substantially cylindrically and a flange 35 which seats in a receiving groove in slide 11 supporting block 15. Cylindrical portion 34 has a groove along its length including a straight portion at 37 and a helical portion at 40. Pin 41 inserted in base 10 extends into the groove extending along cylindrical portion 34. Accordingly, when block 15 is adjacent its inward gaging position rotation of knob 31 advances or retracts the template as a fine adjustment for gage positioning. Near the outer portion of the block movement pin 41 enters straight groove portion 37 and allows a rapid retraction of the block to clear the work for loading and unloading.

This arrangement of relatively fixed and adjustable template blocks is provided to expedite the positioning of parts for loading and their removal following gaging. The adjustability of blocks 15 and 17 accommodates major bends and twists in the blade configuration, giving accurate contour gaging in the gaging planes.

Prior to gaging handles 26 and 28 are used to retract blocks 16 and 19. Similarly knobs 30 and 31 are rotated to retract blocks 15 and 17 from fixed blocks 18 and 20. Then a blade is roughly positioned for gaging by locating in association with knife edges 50 and locating pin 52 on vertical post 54. This serves merely as a rough positioning and other locating means can be provided as necessary for different applications. Blocks 15 to 17 and 19 are then moved to gaging position.

Each of blocks 15 to 20 in this illustrative example are formed of an insulating plastic material supporting a series of parallel gaging wires 60. The adjacent ends of gaging wires 60 are terminated to generally define a nominal part contour and provide spaced exposed conductive elements 62 at their corresponding ends for close association with the blade profile. Wires 60 can be held by casting the plastic material about them or can be slidable and held in adjusted positions determined by a master or the like by set-screws threaded into the sides of the block and engaging each wire. The elements can be located to define the reference contour, as examples, by coordinate dimensions or optically against a chart of the required contours as well as by using a master. It has been found that part spherical gaging ends are most advantageous.

The outer ends of gaging wires 60 extend beyond the respective supporting blocks or templates. With the blocks brought into positioning engagement with the blade it will be appreciated that if the blade contour deviates from nominal some of the conductive elements at the wire tips will be in engagement with the blade surface while others will be spaced therefrom at points of deviation in blade contour.

An electrical gaging circuit is provided for connection between the part and each of the gaging wires or conductive elements 62. With all characteristics of the resulting gaging circuit known except the gap between the wires and the adjacent blade surfaces, the variance in electrical characteristics obtained will be indicative of this gap in each instance and the deviation from nominal blade contour.

In the exemplary circuit of Figure 4 a blade in section is indicated at 70 in association with conducting elements 62 of wires 60. A hand-held stylus 72 provides a contact 74 selectively applied to wires 60. Contact 74 is connected to the circuit.

Through power supply means not shown a potential is maintained across terminals 75 and a higher potential across terminals 76. Terminal 76 to blade 70 is grounded. In one example these potentials are respectively 300 and 3,000 volts. Through the resistive network placed in series with the spark gap between element 62 and blade 70 the current through tube 77 is determined by the current through the gap. The resistive network determines the grid bias on tube 77 which determines the current flow in the cathode circuit and sets the voltage on terminal 78 of oscilloscope 80.

Terminal 81 of oscilloscope 80 is held at a constant potential by glow tube resistive network 84.

Current flow in the spark gap determined by the spark gap width controls the cathode current of tube 77 which in turn determines the voltage at terminal 78. This voltage is then indicated by the position of a dot on the face of the oscilloscope tube. Condenser 86 stabilizes the indication obtained.

Thus as hand-held stylus 72 is selectively applied to the outer ends of gaging wires 60, a presentation is obtained on the tube of oscilloscope 84 which will vary, for example, in its vertical position in accordance with the gap between signal element 62 and the blade surface. If desired, representative tolerance lines can be scribed across the face of the tube and if the presentation is within these lines the variance is within satisfactory limits. Amplification and zero positioning controls 87 and 88 of the oscilloscope aid in obtaining the desired representation during set-up.

In operation the opposed pairs of parallel slender blocks 15 to 20 are relatively retracted and the blade or the like is roughly positioned by mounting on reference surfaces provided on base 10. The opposed blocks sets are then positioned for gaging. Variations in major configuration are accommodated by allowing relative movement between the blocks and, if desired, selected ones of the blocks can be mounted for limited rocking movement to accommodate such overall variations as twist and the like. If a nominal blade is in position, each of the conductive elements 62 will be in engagement with the blade surface at all points. However, variations in blade contour will determine the gap between elements 62 and the adjacent blade surface. When hand-held stylus 72 is applied to each of the signal wires, the resulting variation in electrical characteristic will be determined by the gap and visually indicated on the oscilloscope 84 in this exemplary application. Permanent connections and automatic switching structure could be used in lieu of the hand-held stylus if desired.

Thus it is seen that an extremely simple and economical gaging device has been provided for obtaining accurate indications of contour and dimensional characteristics of blades and the like. Full dimensional presentations are provided eliminating the necessity for operator judgment or extensive experience. Complexly-formed parts such as blades and the like can be rapidly processed with accurate gaging results obtained.

While the exemplary device herein described constitutes a preferred embodiment of the invention, it is to be understood that the invention is not limited to the precise form herein disclosed, and that changes may be made therein without departing from the scope of the invention which is defined in the appended claims.

What is claimed is:

1. A contour gaging device comprising a base, a plurality of parallel conductive wires on said base, corresponding ends of said wires being relatively rigid and non-yielding and terminating to generally define a reference part contour, a holder on said base fixedly supporting said wires in relatively spaced and insulated relationship with their contour defining ends being exposed for association with the part, support means on said base for mounting a part with the contour to be gaged in opposed relation to the contour defining ends of the wires, and electric gaging means selectively applicable to said part and to each of said wires, said electrical gaging means including a source of electrical potential for connection between each of said wires and the part for current flow through any spark gap therebetween and an indicator connected thereto responsive to said current flow to measure width of the gap between each respective wire end and the adjacent part surface as determined by deviations of the part from the nominal contour defined by the wires.

2. A contour gaging device for measuring dimensional characteristics including the contour of a part such as a turbine or compressor blade or the like comprising a base, locating means on said base for roughly positioning a blade for gaging, a plurality of slender template blocks, carrying means on said base supporting said blocks in relatively spaced parallel relationship along each side of a blade to be gaged and in opposed pairs, a plurality of relatively insulated and relatively spaced conducting elements carried by each of said blocks in fixed, non-yielding relationship to generally define a contour corresponding to that of a reference blade at the location of the respective block, said elements being exposed at the template forming edge of said block in relatively fixed relationship for association with the opposed blade surface, said carrying means supporting said blocks for relative retraction for loading and unloading and movement toward one another into engagement with the blade for gaging, and means adapted for selectively connecting said blade and each of said elements to an electrical gaging circuit for measuring the magnitude of the gap between each element and the adjacent blade surface to determine the deviation of the actual blade contour from that of a reference contour, said gaging circuit including means for applying an electrical potential across each element and said blade and for measuring the current flow through any spark gap therebetween.

3. A contour gaging device as set forth in claim 2 wherein said carrying means includes means fixedly mounting a pair of gaging blocks on a common side of a blade to be gaged against movement on the base to engage and locate the blade, the remaining blocks being supported for movement to and from gaging positions.

4. A contour gaging device as set forth in claim 2 including a plurality of gaging wires supported in relatively parallel relationship in a common plane by each of said gaging blocks and having corresponding ends terminated to form a reference part contour and provide the conducting elements.

5. A gaging device for measuring the contour of a part at a plurality of spaced locations comprising a base, a plurality of slender template blocks of an insulating material on said base, means on said base mounting said blocks in relatively spaced parallel relationship, each block being cast about and including a plurality of relatively insulated and spaced conductive elements exposed to define a rigid reference contour, means supporting a part in adjacent relationship with said conductive elements for gaging, an electric gaging circuit including a source of electrical potential, and electric gaging means operably connected to said electric gaging circuit for selectively connecting said source of electrical potential to said part and to each of said conductive elements for providing a current flow through any gap therebetween and for measuring the magnitude of the current flow through any such gap, the magnitude of the current flow being determined by the magnitude of the gap between each respective element and the adjacent part surface.

6. A gaging device as set forth in claim 5 wherein said mounting means includes means carrying said blocks and conductive elements in opposed pairs along a part to be gaged.

7. A gaging device as set forth in claim 6 wherein said carrying means supports said blocks for relative movement toward and from one another for loading and unloading a part to be gaged.

References Cited in the file of this patent

UNITED STATES PATENTS

| | | |
|---|---|---|
| 1,364,534 | Walter | Jan. 4, 1921 |
| 2,417,062 | Coake | Mar. 11, 1947 |
| 2,553,129 | Burnett | May 15, 1951 |
| 2,569,433 | Highberg et al. | Sept. 23, 1951 |
| 2,697,879 | Tandler | Dec. 28, 1954 |
| 2,748,490 | Tandler | June 5, 1956 |
| 2,752,690 | Heath | July 3, 1956 |
| 2,830,114 | Carlson | Apr. 8, 1958 |

FOREIGN PATENTS

| | | |
|---|---|---|
| 654,908 | Germany | Dec. 16, 1937 |
| 778,552 | Great Britain | July 10, 1957 |